UNITED STATES PATENT OFFICE 2,518,122

MANUFACTURE OF HALOGENATED HYROCARBON OILS

John D. Calfee, Manhasset, and Charles B. Miller, St. Albans, N. Y., assignors to Allied Chemical & Dye Corporation, New York, N. Y., a corporation of New York No Drawing. Application March 11, 1948, Serial No. 14,392

5 Claims. (Cl. 204—163)

This invention relates to the manufacture of halogenated hydrocarbon oils and is particularly concerned with the production of such oils by polymerization.

In the past it has been proposed to produce polymeric products by the polymerization of perhalogenated ethylene at elevated temperatures and normal atmospheric or higher pressures. This process is said to produce cycloparaffinic polymers. Thus it has been stated that tetrafluoroethylene heated in a pressure vessel at 200° C. yields polymeric products such as octafluorocyclobutane. If this process is applied to difluorovinyl chloride, no substantial formation of polymeric products is obtained.

It is an object of the present invention to produce halogenated hydrocarbon oils from difluorovinyl chloride. A further object is to polymerize difluorovinyl chloride to oily polymers. A further object is to provide halogenated hydrocarbon oils suitable for use as chemical intermediates, lubricants, heat transfer media, dielectrics, hydraulic fluids and the like from difluorovinyl chloride.

In accordance with the present invention difluorovinyl chloride is converted to polymeric oils by heating at 350° to 425° C. at an absolute pressure of at least 400 lbs. per sq. in. The process may be conducted in an autoclave or in a continuous type of reactor such as a tube free of packing or a packed column.

Under the conditions of this process difluorovinyl chloride readily yields polymeric oils. These oils differ in nature from those obtained previously from perhalogenated ethylene in that the difluorovinyl chloride polymers are unsaturated open-chain products rather than cycloparaffins. The difluorovinyl chloride polymer mixtures are oils boiling from 70° C. at normal pressure up to 200° C. and above at 4 mm. of mercury absolute. They readily absorb chlorine in daylight to form stable, higher-boiling halogenated paraffin hydrocarbon oils.

Preferably the process of the invention is carried out in a continuous type of reactor at pressures between 400 and 5000 lbs. per sq. in.

The following example illustrates the production of difluorovinyl chloride polymers by the process of the invention.

A pressure reactor, having an inlet at the top and outlet at the bottom, was packed with granular (8 to 14 mesh) inactive graphite and heated to 385° C. An outlet at the bottom of the reactor led to an air-cooled liquid trap from which a vapor conduit led to a condenser cooled by means of a Dry-Ice acetone mixture. The pressure on the system was raised to 540 lbs. per sq. in. gauge by introducing nitrogen, and 225 parts of difluorovinyl chloride was then allowed to pass through the reactor in a period of 6½ hours while these pressure and temperature conditions were maintained. 169 parts of oil was recovered as product, 119 parts in the liquid trap and 50 parts in the condenser. It contained 38.6% fluorine and 31.8% chlorine.

The product, upon fractional distillation through a 15 plate rectifying column, yielded 11% by weight of material boiling below 70° C., 15% boiling between 70° and 100° C., 19% boiling between 100° and 170° C., and 55% boiling for the most part between 170° C. at atmospheric pressure and 200° C. at 4 mm. of mercury absolute pressure. The recovered fractions contained fluorine and chlorine in proportions closely similar to those in the starting material and were found to absorb chlorine in the presence of sunlight to produce chlorine derivatives of higher boiling point. Thus, the dimer fraction boiling at 70° to 80° C., when treated with elemental chlorine gas in the presence of light (a common tungsten filament incandescent electric light) yielded as product a stable oil boiling at approximately 140° to 150° C. The chemical composition of the chlorinated product was $C_4H_2Cl_4F_4$:

|  | Calculated | Observed |
|---|---|---|
| Molecular Weight | 268 | 270 |
| Per Cent Chlorine | 52.9 | 51.6 |

We claim:

1. A process for making halogenated hydrocarbon oils, which comprises heating difluorovinyl chloride at a temperature between 350° and 425° C. and at a pressure of at least 400 lbs. per sq. in.

2. The process defined in claim 1, wherein difluorovinyl chloride is passed through a reaction zone maintained at a temperature between 350° and 425° C. and at a pressure between 400 lbs. per sq. in. and 5,000 lbs. per sq. in.

3. The process of making stable halogenated hydrocarbon oils which comprises polymerizing difluorovinyl chloride by the process defined in claim 2 and chlorinating the resulting product with elemental chlorine in the presence of light.

4. The process of making stable halogenated hydrocarbon oils which comprises polymerizing difluorovinyl chloride by the process defined in claim 1 and chlorinating the resulting product with elemental chlorine in the presence of light.

5. The process of making stable halogenated hydrocarbon oils which comprises heating difluorovinyl chloride at a temperature between 350° and 425° C. and at a pressure between 400 lbs. per sq. in. and 5,000 lbs. per sq. in., separating from the resulting product a distillate fraction distilling at normally atmospheric pressure between 70° and 80° C., and chlorinating this fraction with elemental chlorine in the presence of light until its boiling point has been raised to between 140° and 150° C.

JOHN D. CALFEE.
CHARLES B. MILLER.

REFERENCES CITED

The following references are of record in the file of this patent:

UNITED STATES PATENTS

| Number | Name | Date |
|---|---|---|
| 2,067,172 | Carothers | Jan. 12, 1937 |
| 2,291,574 | Gleason et al. | July 28, 1942 |
| 2,352,525 | Evans | June 27, 1944 |
| 2,379,409 | Bacon et al. | July 3, 1945 |
| 2,404,374 | Harmon | July 23, 1946 |
| 2,426,080 | Chapman et al. | Aug. 19, 1947 |

FOREIGN PATENTS

| Number | Country | Date |
|---|---|---|
| 677,071 | Germany | June 17, 1939 |

OTHER REFERENCES

Henne et al., Journal American Chemical Society, vol. 69 (1947), pp. 279–281.